L. BRENSDAL.
SHINGLE BREAD MACHINE.
APPLICATION FILED JUNE 8, 1910. RENEWED NOV. 27, 1912.
1,055,129.
Patented Mar. 4, 1913.
3 SHEETS—SHEET 1.
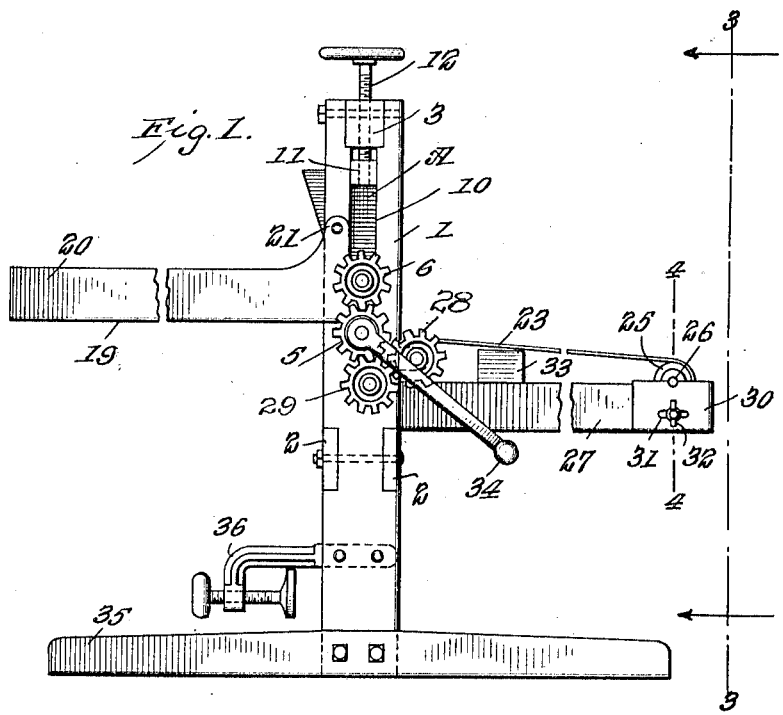
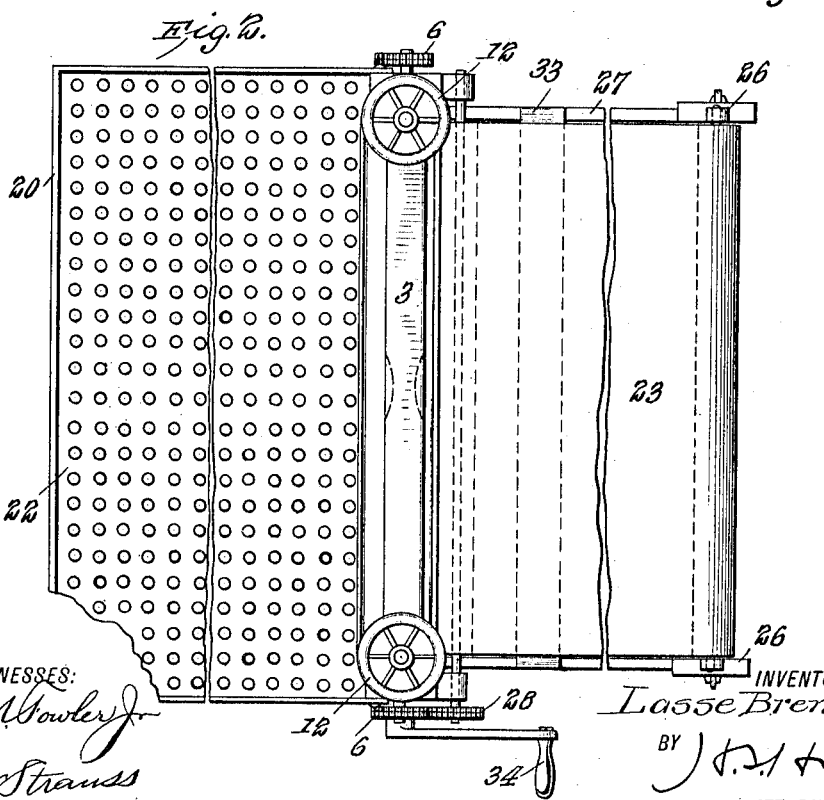

L. BRENSDAL.
SHINGLE BREAD MACHINE.
APPLICATION FILED JUNE 8, 1910. RENEWED NOV. 27, 1912.
1,055,129.
Patented Mar. 4, 1913.
3 SHEETS—SHEET 2.
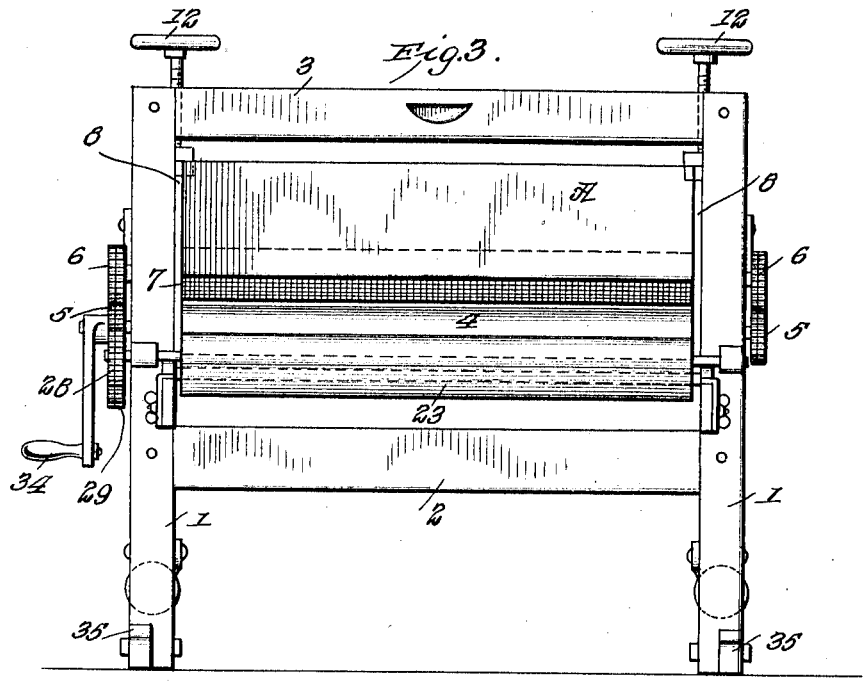
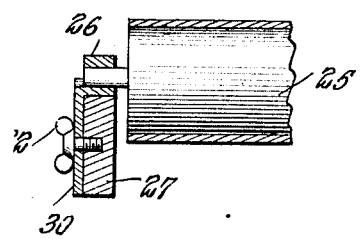
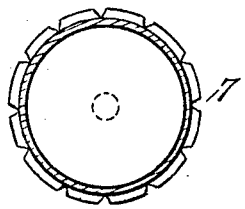
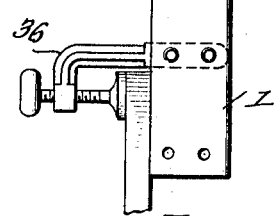
WITNESSES:
J. M. Fowler Jr.
N. Strauss
INVENTOR
Lasse Brensdal
BY J. H. Hill
ATTORNEY

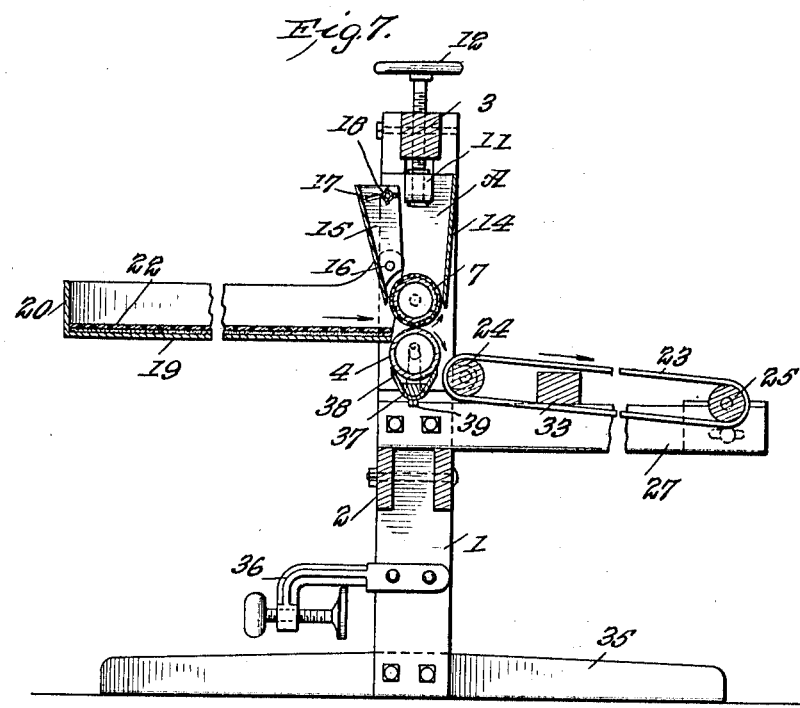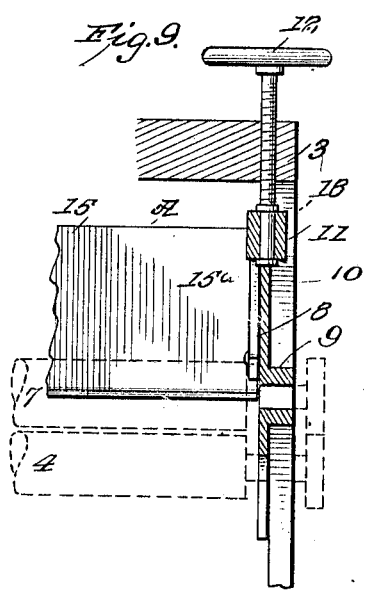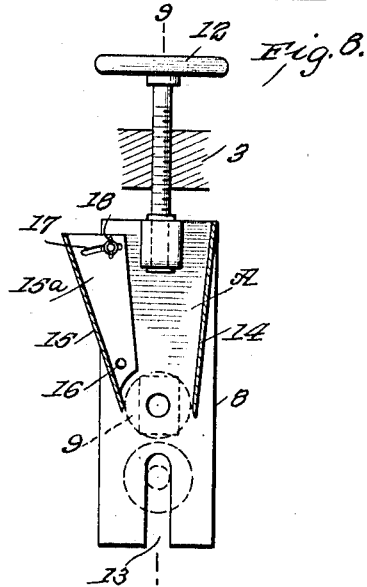

UNITED STATES PATENT OFFICE.

LASSE BRENSDAL, OF PIERRE, SOUTH DAKOTA.

SHINGLE-BREAD MACHINE.

1,055,129.  Specification of Letters Patent.  Patented Mar. 4, 1913.

Application filed June 8, 1910, Serial No. 565,869. Renewed November 27, 1912. Serial No. 733,898.

*To all whom it may concern:*

Be it known that I, LASSE BRENSDAL, a subject of the King of Norway, residing at Pierre, in the county of Hughes and State of South Dakota, have invented certain new and useful Improvements in Shingle-Bread Machines, of which the following is a specification.

The present invention relates to an improved machine for rolling dough or similar plastic material into thin sheets, and is more particularly designed for the manufacture of what is commonly known as "shingle bread" and is termed in the Scandinavian language as "flat bread," the said shingle bread or flat bread being made by mixing flour, water, and other ingredients, into a dough, rolling the dough into a thin sheet about one-sixteenth of an inch thick, and then baking the same until it becomes hard and crisp.

One of the objects of the invention is the provision of a machine of this character embodying novel features of construction whereby the dough can be easily and quickly rolled into a thin sheet, thereby saving the manufacturer from the hard work of rolling out the dough by hand into the small flat cakes in the usual manner.

The invention further contemplates a shingle bread machine which is comparatively simple and inexpensive in its construction, which will occupy a comparatively small amount of space when not in use, and which will operate in an effective manner to accomplish the desired result.

With these and other objects in view, the invention consists in certain combinations and arrangements of the parts as will more fully appear as the description proceeds, the novel features thereof being pointed out in the appended claims.

For a full understanding of the invention, reference is to be had to the following description and accompanying drawings, in which:

Figure 1 is an end view of a shingle bread machine constructed in accordance with the invention, portions being broken away. Fig. 2 is a top plan view of the same, portions being broken away. Fig. 3 is a side view of the machine looking in the direction indicated by the arrows on Fig. 1. Fig. 4 is a transverse sectional view on the line 4—4 of Fig. 1. Fig. 5 is an enlarged transverse sectional view through the upper roller. Fig. 6 is an enlarged detail view of the lower end of one of the upright standards, the foot being removed and the clamp being shown as engaging a vertical support. Fig. 7 is a longitudinal sectional view through the machine. Fig. 8 is an enlarged sectional view through the hopper, and Fig. 9 is a sectional view on the line 9—9 of Fig. 8.

Corresponding and like parts are referred to in the following description and indicated in all the views of the drawings by the same reference characters.

Specifically describing the present embodiment of the invention, the supporting frame of the machine comprises a pair of uprights 1 which are connected at an intermediate point in their length by the cross bars 2, and are also connected at their upper ends by the cross bar 3, the said cross bars serving to hold the uprights rigidly in a properly spaced position. A roller 4 is journaled between the uprights 1 at a point above the cross bars 2, and the trunnions of this roller project through the uprights 1 and are provided with pinions 5. These pinions 5 mesh with similar pinions 6 applied to the ends of an upper roller 7 which is designed to coöperate with the before mentioned roller 4 to roll the dough into thin sheets. This upper roller 7 forms the bottom of a hopper A which is designed to receive a quantity of flour and to feed the same to the top of the dough so that the said dough will not stick to the upper roller. The ends of the hopper A are in the nature of plates 8 which fit against the inner faces of the uprights 1, the said plates being formed with outwardly projecting bearings 9 within which the upper roller 7 is journaled and which are loosely received within slots 10 formed in the uprights. It will also be observed that the upper end of each of the plates 8 is formed with a block 11 which is slidably mounted within the upper portion of the corresponding slot 10, and which has a swiveled connection with the lower end of an adjusting screw 12, the said adjusting screw being threaded in the upper cross bar 3. The lower end of each of the plates 8 extends below the hopper and is formed with a slot 13 loosely receiving the trunnions of the lower roller 4. It will thus be obvious that the upper roller 7 is carried by the hopper A and that both the said hopper and the upper roller can be raised and lowered through the medium of the adjusting screws 12. In this manner the space between the two rollers 4 and 7 can be regulated according to the thickness of the sheet in which it may be desired to roll the dough. Both of the rollers 4 and 7 are preferably formed of tubular steel, and the outer surface of the lower roller is smooth, while the outer surface of the upper roller is provided with longitudinal and circumferential grooves for marking the shingle bread in the usual manner.

The side 14 of the hopper A is rigidly mounted and the lower edge thereof bears against one side of the upper roller 7. The opposite side 15, however, is movably mounted so that the lower edge thereof can be moved toward or away from the roller 7 to regulate the feeding of the flour from the hopper to the dough. This movable side 15 is shown as formed with inwardly extending end flanges 15ª which extend from the top of the side to a point spaced from the bottom thereof, the lower portion of each of the flanges being pivoted to the adjacent end plate 8 as indicated at 16, while the upper portion of each of the flanges is formed with a transverse slot 17 adapted to engage a clamping screw 18. With this construction, it will be obvious that by loosening the clamping screw 18 and swinging the movable side 15 of the hopper about the pivot pin 16, the space between the lower edge of the said movable side and the upper roller 7 can be adjusted to regulate the flow of flour therefrom.

The dough is designed to be fed to the rollers 4 and 7 from a horizontally disposed shelf or table 19 which is applied to the uprights 1 at a suitable elevation. In the present instance, this table 19 is shown as having an upwardly extending flange 20 at the sides and end thereof, the portions of the flange adjacent the uprights 1 being extended upwardly and pivotally connected thereto at 21. When the machine is not in use the table 19 can be swung upwardly about these pivots 21 to admit of the machine being stored in a very small amount of space. Some perforate member such as a screen 12 would be placed upon the table 19 under the dough, and a supply of flour would be arranged under this screen 22. In this manner a proper amount would be automatically supplied to the lower surface of the dough as it was fed to the rollers to prevent the said dough from sticking to the lower roller 4.

The sheet of dough emerging from between the rollers 4 and 7 is received upon an endless apron 23 which passes around a roller 24 journaled in suitable bearings upon the uprights 1, and also around the roller 25 journaled in bearings 26 upon the outer ends of lateral arms 27 projecting from the uprights 1. One end of the roller 24 is provided with a pinion 28 which receives motion through an idler 29 from one of the pinions 5 applied to the lower roller 4. It will thus be obvious that the apron 23 will be moved simultaneously with the rollers 4 and 7 and will receive the thin sheet of dough as it emerges from the said rollers. The bearings 26 are provided with plates 30 having slots 31 therein which receive clamping screws 32. This construction admits of the roller 25 being properly adjusted to remove all slack from the apron 23. A cutting block 33 which rests loosely upon the lateral arms 27 so as to be moved in and out as desired is arranged under the upper reach of the apron 23 so as to form a backing therefor and enable the dough to be cut into the desired shapes by a blunt instrument while upon the apron. The lateral arms 27 are preferably detachably applied to the uprights 1 so that they can be removed from the uprights and folded against the same when the machine is not in use.

For the purpose of operating the machine, a handle 34 is shown as applied to one end of the lower roller 4, the said handle being designed to be turned by the operator and motion being imparted through the medium of the various pinions to both the upper roller 7 and the apron 23.

Shoes or cross pieces 35 are detachably applied to the lower ends of the uprights 1 and serve to hold the machine in an upright position when it is placed upon a table or other horizontal support. However, should it be desired to apply the machine to the upper edge of a vertical support, the shoes 35 would be removed and the clamps 36 which are applied to the lower ends of the uprights 1 brought into operation.

A bar 37 which connects the uprights 1 is arranged immediately below the lower roller 4 and has a scraper 38 secured thereto in some suitable manner as by means of the screws 39. This scraper has a substantially U shaped cross section and the edges thereof engage opposite sides of the roller 4 so as to effectively scrape the surface thereof and remove any adhering particles therefrom.

In the operation of the device, dough will be placed upon the screen 22 on the table 19 and will be fed from this table to the rollers 4 and 7, the lower surface of the dough receiving flour through the screen 22 to prevent the dough from sticking to the lower roller, while the upper surface of the dough receives flour from the hopper A to prevent the dough from sticking to the upper roller. These two rollers 4 and 7 operate upon the dough as it passes between the same to produce a thin sheet which is delivered to the apron 23 upon which it may be cut into the desired shapes.

It is to be understood that when rolling thicker and heavier shingle bread, the upper roller 7 could be removed and replaced by a similar roller in which the grooves were somewhat deeper and spaced farther apart. These grooves upon the upper roller may also be in any desired configuration, either triangular as illustrated upon the drawings, or any other shape which may be found expedient.

Having thus described the invention, what I claim as new and desire to secure by Letters Patent, is:—

1. In a machine for rolling dough into sheets, the combination of a pair of spaced uprights, a fixed roller extending between the uprights and provided at the ends thereof with trunnions which are journaled within the uprights, a hopper slidably mounted between the uprights and formed with an open bottom and also with ends which fit against the inner faces of the uprights, the said ends being extended downwardly below the hopper and having the lower ends thereof slotted to loosely receive the trunnions of the fixed roller, a second roller arranged within the open bottom of the hopper and journaled between the ends of the hopper, the said roller being arranged parallel to the fixed roller, and means for sliding the hopper between the uprights to vary the distance between the rollers, the slots in the downwardly extended ends of the hopper coöperating with the trunnions of the fixed roller to hold the hopper against lateral displacement.

2. In a machine for rolling dough into sheets, the combination of a pair of spaced uprights formed with slots, a cross bar connecting the upper ends of the uprights, a fixed roller extending between the uprights and provided at the ends thereof with trunnions which are journaled between the uprights, a hopper formed with an open bottom and slidably mounted between the uprights, the ends of the hopper bearing against the inner faces of the uprights and extending downwardly below the bottom of the hopper where they are slotted to loosely receive the trunnions of the fixed roller, a bearing block projecting outwardly from each end of the hopper and loosely received within the slot of the respective upright, a second block projecting outwardly from each end of the hopper and also received within the slot of the respective upright, a movable roller journaled between the first mentioned blocks and arranged within the open bottom of the hopper parallel to the first mentioned roller, and adjusting screws threaded upon the cross bar and engaging the second mentioned blocks for sliding the hopper to regulate the distance between the rollers, the hopper being directed in its movements by the blocks which are received within the slots of the uprights, and also by the slotted ends of the hopper which receive the trunnions of the first mentioned roller.

In testimony whereof I affix my signature in presence of two witnesses.

LASSE BRENSDAL.

Witnesses:
 LYDIA B. JOHNSON,
 A. S. SENTER.

---

Copies of this patent may be obtained for five cents each, by addressing the "Commissioner of Patents, Washington, D. C."